(12) United States Patent
Jin et al.

(10) Patent No.: US 7,480,372 B2
(45) Date of Patent: Jan. 20, 2009

(54) METHOD AND APPARATUS FOR DIVISION OF REVENUE OF COMMUNICATION AMONG DIFFERENT PROPRIETORS

(75) Inventors: ShuGuang Jin, Shanghai (CN); Yan Chen, Shanghai (CN); PeiLiang Xu, Shanghai (CN)

(73) Assignee: Alcatel, Parisk (FR)

( * ) Notice: Subject to any disclaimer, the term of this patent is extended or adjusted under 35 U.S.C. 154(b) by 959 days.

(21) Appl. No.: 11/002,228

(22) Filed: Dec. 3, 2004

(65) Prior Publication Data

US 2005/0135577 A1 Jun. 23, 2005

(51) Int. Cl.
*H04M 15/00* (2006.01)
(52) U.S. Cl. .............................. 379/115.01; 379/114.01; 379/114.03; 379/121.01; 379/127.04; 370/352; 370/401
(58) Field of Classification Search ................. 379/111, 379/112.01, 112.06, 114.01, 114.03, 114.05, 379/114.06, 115.01, 121.01, 121.04, 121.05, 379/127.04, 127.05; 370/352–356, 401
See application file for complete search history.

(56) References Cited

U.S. PATENT DOCUMENTS

| | | | |
|---|---|---|---|
| 5,768,353 A | 6/1998 | Browne | |
| 5,910,979 A | 6/1999 | Goel | |
| 6,134,307 A | 10/2000 | Brouckman | |
| 2004/0033797 A1 | 2/2004 | Raivisto | |
| 2004/0103040 A1* | 5/2004 | Ronaghi et al. | ............... 705/26 |
| 2004/0210522 A1 | 10/2004 | Bissantz | |

FOREIGN PATENT DOCUMENTS

| | | |
|---|---|---|
| EP | 0 483 091 A | 4/1992 |
| EP | 0 569 175 A | 11/1993 |
| WO | WO 03/049351 A | 6/2003 |

* cited by examiner

*Primary Examiner*—Binh K Tieu
(74) *Attorney, Agent, or Firm*—Sughrue Mion, PLLC

(57) ABSTRACT

A method and apparatus for division of revenue of communication among different proprietors is provided in this invention, where the division of revenue among the different proprietors is performed by a gateway office, wherein the gateway office will set a source parameter and a destination parameter respectively from the source and the destination when a call goes through the gateway office; Judge the two parameters to get a revenue zone index; Judge the value of the revenue zone index, and modulate the revenue zone index to get a revenue class index; The gateway office generates contents related to the revenue class index; A central memory receives all these contents, adds an increment of each counter of the revenue class memory related to the revenue class index to a corresponding counter and carries out multiple safety mechanisms; Output the information in the revenue class memory to a storage medium for storing, then output it to a billing center for revenue sorting. The billing mode present in this invention is based on group pairs, so it is more adaptive for the gateway office to divide revenue.

10 Claims, 3 Drawing Sheets

METHOD AND APPARATUS FOR DIVISION OF REVENUE OF COMMUNICATION AMONG DIFFERENT PROPRIETORS

TECHNICAL FIELD

The present invention relates to a method and apparatus for division of revenue of telecommunication among different proprietors.

RELATED ART

As to the relay jumping table billing, in the SPC exchange, it takes relay groups (income and outgoing) as revenue billing units, and accumulates all metering impulses of the relay group as the billing content. Although this technology is simple, it is not able to provide enough flexibility in resource sorting and billing content selecting.

As to the detail billing, in the SPC exchange, it generates a detail record for each call. All these records (telephone billing list) will be sent out from the SPC exchange after a specific period. A specific sorting department sorts all received telephone billing list, which will be treated as the billing content after sorting and summation. It can satisfy all kinds of user's customized demands, but there is a large number of temporary data transferring between the SPC exchange and the sorting department, and the investments on the equipments will be expanded greatly in order to satisfy demands.

SUMMARY OF THE INVENTION

In order to solve said problems of existing technology, this invention provides all kinds of methods for the division of revenue at the SPC exchange level of the gateway office, to satisfy various potential billing demands among the proprietors. Moreover, it is needless for proprietors to add investments immediately to meet with the additional demands for detail billing because of this demand.

The present invention provides a method for division of revenue of communication among different proprietors, wherein the division of revenue among the different proprietors is performed by a gateway office, the method comprising that:

a) When a call goes through the gateway office, the gateway office gets a source of a calling user and a destination of a called user respectively from different proprietors, and extracts a source parameter and a destination parameter from the source and the destination;

b) The gateway office judges values of the source parameter and the destination parameter as said in step a), and if there is one of values of the parameters corresponding to a parameter value for stopping a function on the division of revenue, the division of revenue function is stopped, otherwise, a corresponding revenue zone index is obtained according to said source parameter and destination parameter and step c) is executed;

c) The gateway office judges a value of the revenue zone index as said in step b), if it corresponds to the parameter value for stopping the division of revenue function, the revenue division function is stopped, otherwise, said revenue area index is modulated according to said call, a corresponding revenue class index $R_j$, $j=1, 2 \ldots n$ is obtained, and step d) is executed;

d) The gateway office generates contents related to the revenue class index $R_j$ as said in step c), and sends the contents to a central memory of the gateway office after said calling is finished;

e) The central memory of the gateway office receives the contents related to said revenue class index $R_j$ as said in step d), and based on these contents, adds an increment of each counter in revenue class memory $M_j$ ($j=1, 2 \ldots n$) related to the revenue class index $R_j$ to the corresponding counter and performs multiple safety mechanisms;

f) The central memory sends information in the revenue class memory $M_j$ obtained in step e) to a storage medium. The storage medium stores the information with a predefined formatted scheme and sends the information to a billing center for sorting the revenue wherein in said step c), said revenue zone index is modulated by a modulation parameter or several modulation parameters, and the obtained revenue class index varies with different modulation parameters which include type of call, bear capacity, high level carrying (HLC), analog or ISDN user.

wherein in said step d), said contents related to the revenue class index $R_j$ as said in step c) include static and dynamic information on the call as said in step a);

In said step e), the revenue class memory $M_j$($j=1, 2 \ldots n$) is set according to user's needs during initialization in the gateway office;

In said step f), the central memory sends the information in the revenue class memory $M_j$ as said in step e) to a display terminal.

wherein in said step e), the multiple safety mechanisms include:

The central memory introducing a windowing mechanism during a receiving procedure;

The accumulation of each counter having a hot backup;

Each counter backups its information to a pair of hard disks with specific intervals.

wherein in said step f), the predefined formatted scheme is either a general scheme or a scheme customized according to user's needs.

The present invention provides an apparatus for division of revenue of communication among different proprietors, wherein the division of revenue among the different proprietors is performed by a gateway office, the apparatus comprising a source and destination device located in the gateway office, and further a trigger device, a modulation device, an information generation device, a central memory and a storage medium which are all located in the gateway office, wherein:

When a call goes through the gateway office, the source and destination device located in the gateway office respectively extracts a source parameter and a destination parameter according to a source of calling user and a destination of called user;

The trigger device judges values of the source parameter and the destination parameter, and if there is one of the values of the parameters corresponding to a parameter value for stopping a function on the division of revenue, the revenue division is stopped, otherwise, a corresponding revenue zone index is obtained according to said source parameter and destination parameter, and then judges a value of said revenue zone index, if it corresponds to the parameter value for stopping the revenue division function, t the revenue division function is stopped, otherwise, said revenue zone index is sent to the modulation device;

The modulation device, according to said call, modulates said revenue area index from the trigger device, and obtains the corresponding revenue class index $R_j$, $j=1, 2 \ldots n$;

The information generation device, according to said revenue class index $R_j$, $j=1, 2 \ldots n$, generates contents related to said revenue class index $R_j$, and sends them to the central memory after said call is finished;

The central memory receives the contents related to said revenue class index $R_j$, and based on these contents, adds an increment of each counter in revenue class memory $M_j$ (j=1, 2 . . . n) related to the revenue class index $R_j$ to the corresponding counter, and performs multiple safety mechanisms, and then sends information in said revenue class memory $M_j$ to the storage medium;

The storage medium stores the information in said revenue class memory $M_j$ with a predefined formatted scheme and sends the information to a billing center for sorting the revenue.

wherein said revenue zone index is modulated in the modulation device by a modulation parameter or several modulation parameters, and the obtained revenue class index varies with different modulation parameters which include type of call, bear capacity, high level carrying (HLC), analog or ISDN user.

Wherein said contents related to the revenue class index $R_j$ include static and dynamic information on the said call;

Said revenue class memory $M_j$ (j=1, 2 . . . n) is set according to user's needs during initialization in the gateway office;

Said apparatus also includes a display terminal, which is used to display the information in said revenue class memory $M_j$.

wherein said multiple safety mechanisms include:

The central memory introducing a windowing mechanism during a receiving procedure;

The accumulation of each counter having a hot backup;

Each counter backups its information to a pair of hard disks with specific intervals.

wherein the predefined formatted scheme is either a general scheme or a customized scheme according to user's needs.

The division of revenue of this invention is a kind of billing method based on group pairs, making it more adaptive for gateway offices to divide revenue. Moreover, the division of revenue method present in this invention is not only based on relays, but it can also be realized by other billing units, comparing to the present technology whose billing unit is simply based on relays. The revenue class in this invention is abstract, and can be a mixture of several different entity types. Besides, the present invention also adopts a new normalized input and output format for the division of revenue.

DETAILED DESCRIPTION OF THE INVENTION

This invention will be further explained with reference to the drawings and an embodiment.

This invention provides a method and a apparatus for division of revenue of communication among different proprietors, wherein the division of revenue among the different proprietors is performed by a gateway office.

Here, the gateway office is an interface exchanging office carrying out transmission of telephone services among different proprietors. For instance, a user of the Shanghai Mobile makes a call to another fixed phone user of the Shanghai Telecom, which will reach the fixed phone user via a gateway office between the two companies. Since the Shanghai Telecom proprietor has supplied its resource, it will count this kind of resource at the gateway office, and then come to a settlement with the Shanghai Mobile for the revenue. Therefore, the main function of the gateway office is to separately count resources occupied and divide revenue among different proprietors. At the same time, it also provides other gateway services such as the call identification authority and black/white list. The Division of Revenue (DOR) is used to count communication resource among different proprietors.

Figure 1:
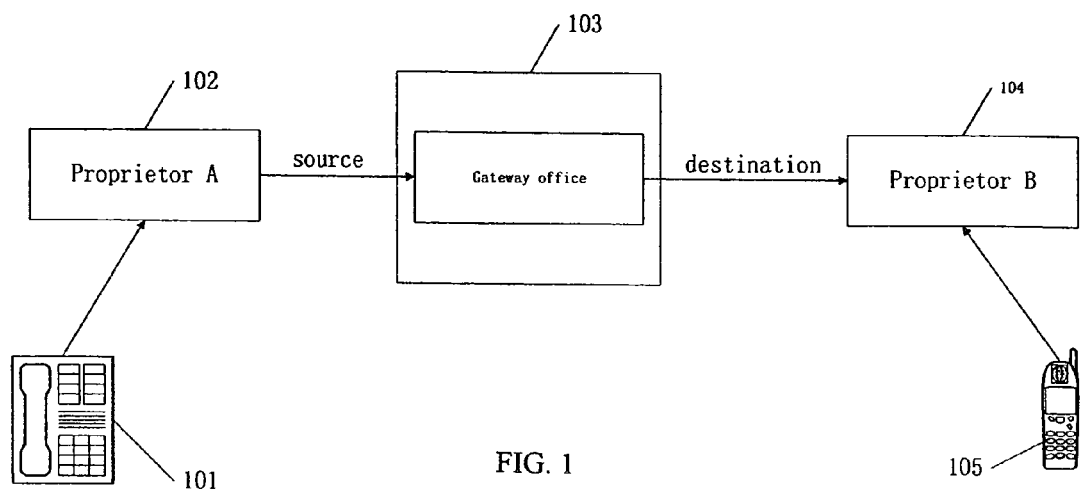
FIG. 1 is a flowchart illustrating different proprietors realizing division of revenue by the gateway office in accordance with a preferred embodiment of the invention.

As shown in FIG. 1, the user 101 is a user of the proprietor A 102 and the user 105 is a user of the proprietor B 104. When a call from the calling user 101 to the called user 104 go in and out from the gateway office 103, the gateway office 103 will get a source from the proprietor A, such as Beijing, and get a destination from the proprietor B, such as Shanghai.

Figure 2:
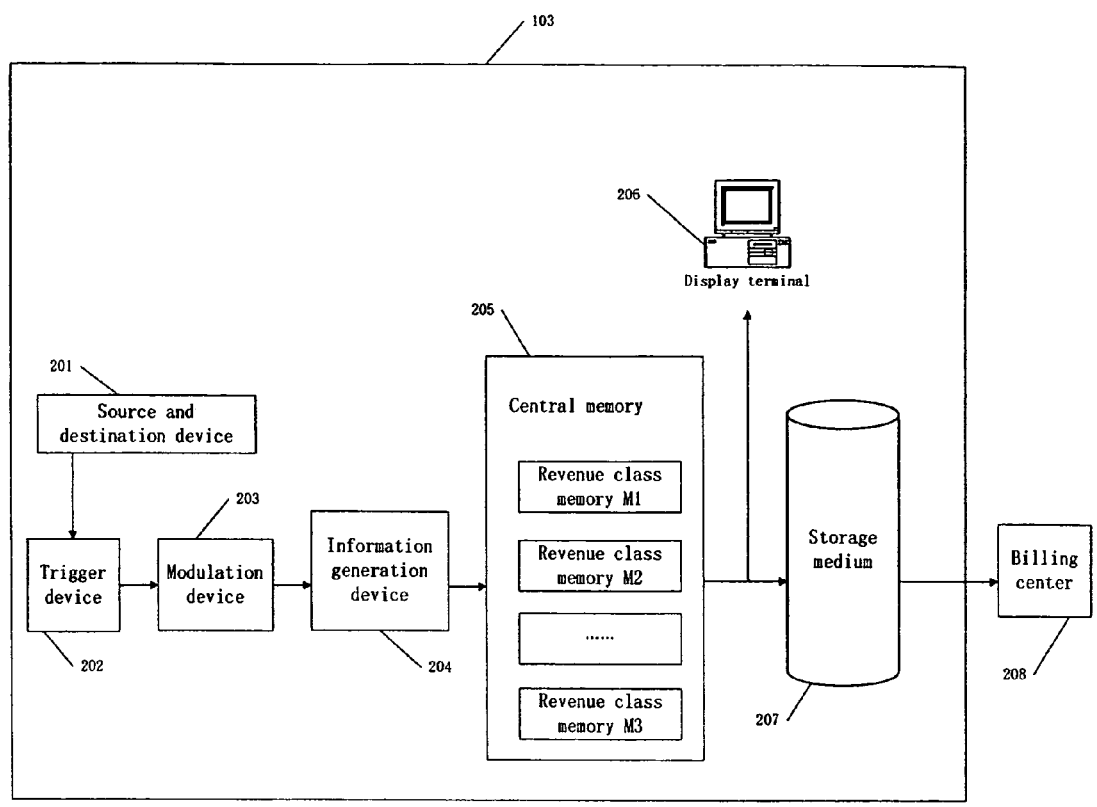
FIG. 2 is a map of the gateway office realizing division of revenue in accordance with a preferred embodiment of the invention.

FIG. 2 is a map of the gateway office implementing division of revenue in accordance with an embodiment of the invention, including a source and destination device 201, a billing center 208, which are existing technology, and a trigger device 202, a modulation device 203, an information generation device 204, a central memory 205, a display terminal 206 and a storage medium 207, which are added in this invention. As shown in FIG. 2, the source and destination device 201 of the gateway office 103 gets a source parameter and a destination parameter respectively from the source and the destination, which is a numeric value (0-255). For example, if the source is Beijing, the value of the source parameter is "1", and if the destination is Shanghai, the value of the destination parameter is "2".

At this time the route is already elected to pass, namely when the called user starts ringing, the trigger device 202 of the gateway office 103 judges the value of source and destination parameters. If there is a parameter's value corresponding to the value for stopping the division of revenue function, for example, in this embodiment, if there is a parameter whose value is 0, the division of revenue function is stopped. Those users who do not need this function shield it to consume the least resources. Otherwise, the trigger device 202 obtains a revenue zone parameter according to the source parameter and the destination parameter, as show in table 1.

TABLE 1

| | Destination | | | |
|---|---|---|---|---|
| Source | Beijing | Shanghai | . . . | . . . |
| Beijing | X1 (north china revenue zone index(1)) | X2 (north china - east china revenue zone index (2)) | . . . | . . . |
| Shanghai | X3 (east china - north china revenue index (3)) | X4 (east - china revenue zone index (4)) | . . . | . . . |
| . . . | . . . | . . . | . . . | . . . |
| . . . | . . . | . . . | . . . | Xn |

$x_1, x_2, x_3, x_4 \ldots x_n$ in the table 1 are revenue zone indices. In this embodiment, the source is Beijing (1) and the destination is Shanghai (2). The trigger device 202 judges the source parameter value and the destination parameter value, if neither of them is zero, the corresponding revenue zone index $x_2$ is obtained, namely North China-East China revenue zone index, whose revenue zone index value is "2". As shown in table 1, in this invention, the revenue zone indices with different values can simply correspond to the different revenue class indices, which means obtaining many different revenue class indices. In existing technology, if the source and the destination are respectively output relay group and input relay group, it realizes the relay jump table function, and the largest number of the relay group soft table is 10 or 14. In this invention, we can dynamically assign many revenue class indices to one input relay group+several destinations, or to one output relay group+several sources, which actually means a relay group can have the nearly infinite number of the soft tables. This already breaks through the number limitation of the relay group soft table, which is 10 or 14 in the existing technology, therefore, this invention actually functions better than the current relay jump table technology.

The trigger device 202 judges the revenue zone index value, if the value is 0, the function of division of revenue is stopped. This is helpful to users' flexible choice, and save system resource to the greatest extent. Otherwise, the modulation device 203 will modulate the revenue zone index. For instance, in this embodiment, the value of the revenue zone index $x_2$ is "2", not "0", so $x_2$ is modulated. Refer to table 2 for detailed modulation process.

As shown in table 2, for instance, proprietors are interested in the voice service of this call, namely require to count and charge the voice service, then said revenue zone index is modulated with one of the modulation parameters and the corresponding revenue class index $R_j$, j=1, 2 . . . n is obtained. In this embodiment, the revenue zone index $x_2$ is modulated with the type of call (voice) modulation parameter and the corresponding revenue class index R1 is obtained, which corresponds to the voice service of the DDD call, namely the DDD call list. Furthermore, if there are other calls corresponding to the ISDN call, the revenue zone index $x_2$ will be modulated with the type of call (voice) modulation parameter, and the corresponding revenue class index R2 will be obtained, which means R2 corresponds to the voice service of the ISDN, namely the ISDN call list.

TABLE 2

| Revenue zone index | Type of call | Revenue class index | Billing list |
| --- | --- | --- | --- |
| X2 (north china - east china revenue zone index(2)) | Type of call (voice) | R1 (east china - north china revenue class index (1)) (DDD call) | DDD billing list |
| | | R2 (east china - north china revenue class index (2)) (ISDN call) | ISDN billing list |
| | | R3 (east china - north china revenue class index (3)) (IN call) | IN billing list |
| | | . . . | . . . |
| | | R4 (east china - north china revenue class index (n)) (other types of call) | Other types of billing lists |

This invention provides an extremely flexible modulation method, wherein said modulating characteristics in this invention means modulating said revenue zone index using one or several modulation parameters, and the different corresponding revenue class indices by different combinations of these modulation parameters are obtained. The purpose of the modulation is to further conclude and arrange all revenue by different modulation parameters, and make revenue sortable according to the proprietor's demand, namely to perform revenue class indexing. At the end, various billing data will be obtained through different revenue class indices. The modulation parameters can be type of call (voice), bear capacity, high level carrying (HLC), analog or ISDN user and so on.

Said modulation in this invention is carried out during the calling process. In the existing technology, the relationship between each revenue zone index and revenue class index is usually one-to-one correspondence, which could satisfy the demand of most users. In this case, the modulation step can be ignored.

After the called user 105 gives reply, and before the call is released, the information generation device 204 of the gateway office 103 generates contents related to said revenue class index, such as R1, which include static and dynamic information on the call. The static information contains the modulating characteristics as shown in table 2, the calling number, the called number, the route and so on, the dynamic information contains the call holding time, the answering time and so on. These static information and dynamic information related to the call will be sent to the central memory 205 of the gateway office 103 after the call is finished.

After the call is released, namely the call is finished, the central memory 205 of the gateway office 103 receives these contents related to said revenue class index $R_j$, and based on these contents, adds the increment values of every counter of the revenue class memory $M_j$ (j=1, 2 . . . n), which is related to said revenue class index $R_j$, to the corresponding counter. For example, in this call there are several counters in the revenue class memory M1 corresponding to the revenue class index R1 of the central memory 205, such as a total-number-of-calls counter, total-length-of-calls counter, etc, which respectively accumulate the total number of calls and the total length of calls, based on this call. This revenue class memory $M_j$ (j=1, 2 . . . n) is set according to users' needs during the gateway office initializing procedure.

Figure 3:
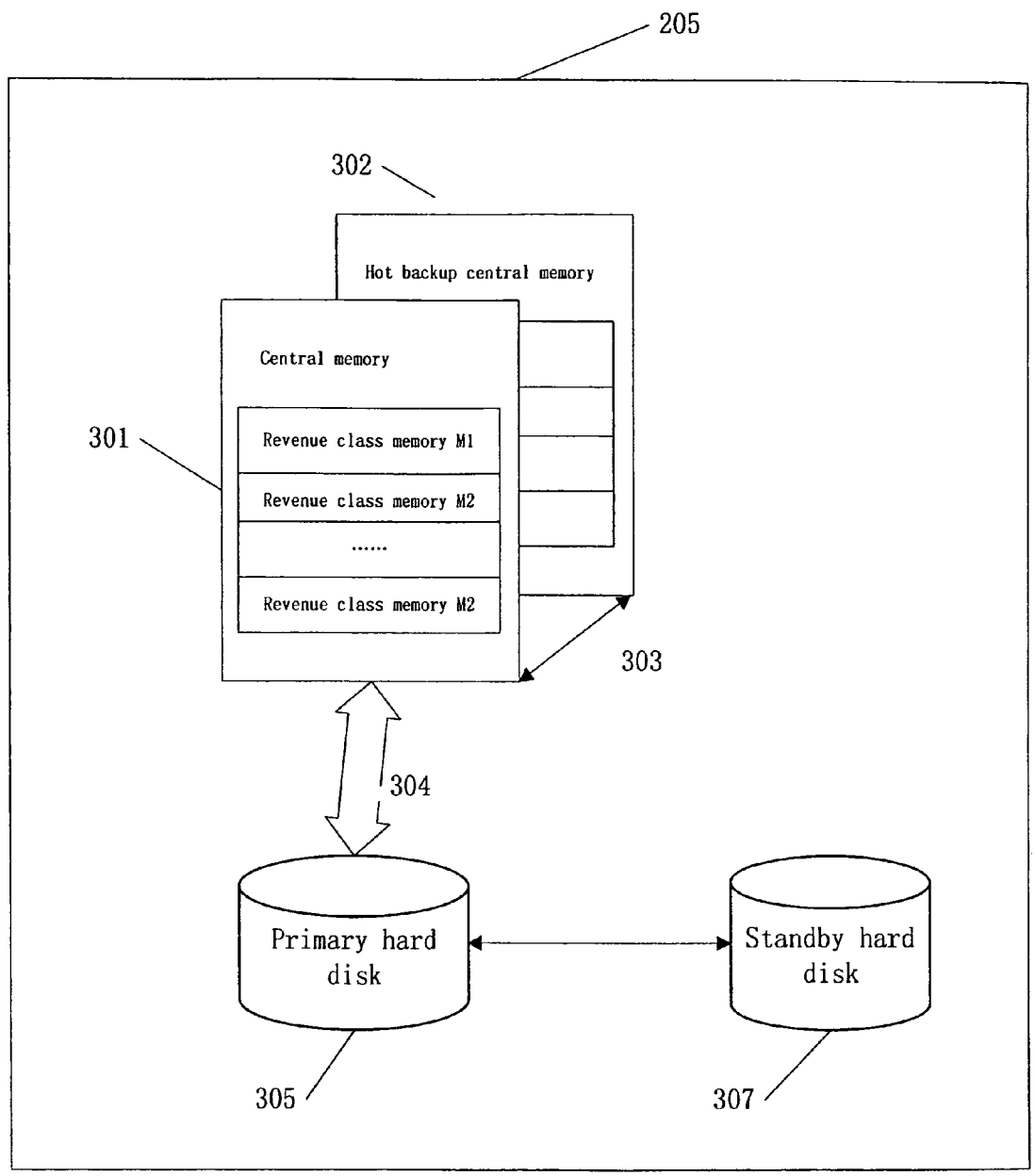
FIG. 3 is a flowchart illustrating the safety mechanisms of the central memory in accordance with a preferred embodiment of the invention.

Because of the importance of the resource, multiple safety mechanisms are performed in the present invention, which including: The central memory 205 introduces a windowing mechanism during the receiving procedure. The accumulation of each counter has a hot backup, as shown in FIG. 3, the central memory 205 is comprised of primary central storage region 301, hot backup central storage region 302, primary hard disk 305 and standby hard disk 307, the primary central storage region 301 and the hot backup central storage region 302 stores at the same time, as arrow 303 shows, one-region working task can be performed under certain circumstances. However, synchronous working starts as soon as the two-region working task takes over. Each counter backups its information to a pair of hard disks with specific intervals, namely to the primary hard disk 305 and the standby hard disk 306, the backuping task is executed by the primary central storage region 301, as arrow 304 shows. Since these safety mechanisms are existing technology, just a simply introduction is provided.

The central memory 205 sends the information of said revenue class memory $M_j$ to the storage medium 207, which stores the information with reference to a predefined formatted scheme and sends the information to the billing center 208 for revenue sorting the same way as other bill documents. The central memory 205 also can send the information of said revenue class memory $M_j$ to the display terminal 206. For example, display contents of each counter of the revenue class memory $M_j$ through display terminal 206, then the network resource occupation situation of each proprietor can be observed directly and instantly, which realizes flexible online operation. The revenue sorting here means arranging the billing data (such as the detailed billing phone lists the double counting jump table file, all said revenue class indices) generated in the gateway office in a document, sending the entire document to the billing center 208, where the document will be operated according to the predefined procedure and reorganized into a list of each revenue class and the corresponding total number of calls, total length of calls.

The predefined format can be a general style, as shown in table 3, the first part is a file header, such as information indicating the revenue dividing category, information on the file generation times information labeling the local gateway office, etc. The following is a revenue class index sequence, the last part is a file trailer, such as an end-of-file indicator; The format can also be a customized style according to the user's need, as shown in table 4, the first part is a file header, such as information indicating the revenue dividing category, information on the file generation times information labeling the local gateway office, etc, the following is a each revenue class index arranged in an order of the relay group and the bear type, the last part is a file trailer, such as an end-of-file indicator.

TABLE 3

| File header (such as: such as information indicating the revenue dividing category, information on the file generation time, information labeling the local gateway office, etc) | |
| --- | --- |
| Arranging each revenue class index in order | Revenue class index sequence number 1<br>Total number of calls<br>Total length of calls<br>Total number of pulses |
| ... | ... |
| File trailer (such as end-of-file indicator) | |

TABLE 4

| File header (such as: such as information indicating the revenue dividing category, information on the file generation time, information labeling the local gateway office, etc) | |
| --- | --- |
| Arranging each revenue class index in an order of the relay group and the bear type | Revenue class index sequence number (1, 2, 3)<br>Corresponding relay group name<br>Corresponding bear type<br>Total number of calls<br>Total length of calls<br>Total number of pulses |
| ... | ... |
| File trailer (such as end-of-file indicator) | |

Therefore, the output format adopted in this invention greatly meets the users' demand, and makes it very convenient for the users to introduce this new function. Moreover, the output format can be customized to meet the needs of various high-end users. The output format provides more options, such as bureau name, file generation time, relay group name and other specific information, making it more supportive to on-line transmission.

More detailed steps corresponding to the embodiment of this invention are as follows:

a) When a call goes through the gateway office, the gateway office gets a source of a calling user and a destination of a called user respectively from different proprietors, and extracts a source parameter and a destination parameter from the source and the destination;

b) The gateway office judges values of the source parameter and the destination parameter as said in step a), and if there is one of values of the parameters corresponding to a parameter value for stopping a function on the division of revenue, the division of revenue function is stopped, otherwise, a corresponding revenue zone index is obtained according to said source parameter and destination parameter and step c) is executed;

c) The gateway office judges a value of the revenue zone index as said in step b), if it corresponds to the parameter value for stopping the division of revenue function, the revenue division function is stopped, otherwise, said revenue area index is modulated according to said call, a corresponding revenue class index $R_j$, j=1, 2 . . . n is obtained, and step d) is executed;

d) The gateway office generates contents related to the revenue class index $R_j$ as said in step c), and sends the contents to a central memory of the gateway office after said calling is finished;

e) The central memory of the gateway office receives the contents related to said revenue class index $R_j$ as said in step d), and based on these contents, adds an increment of each counter in revenue class memory $M_j$ (j=1, 2 . . . n) related to the revenue class index $R_j$ to the corresponding counter and performs multiple safety mechanisms;

f) The central memory sends information in the revenue class memory $M_j$ obtained in step e) to a storage medium. The storage medium stores the information with a predefined formatted scheme and sends the information to a billing center for sorting the revenue As to a medium-sized gateway office (10 hours when busy, 100CAPS bill list), the data volume ratio of detail billing in existing technology to the division of revenue in the present invention is over 100:1.

The present invention also greatly reduces the massive dump of the exchanger, the mass data processing of the sorting center and the mass data storage and transmission, saving various resources.

The division of revenue of this invention is a kind of billing method based on group pairs, making it more adaptive for gateway offices to divide telecommunication revenue. Moreover, the division of revenue method present in this invention is not only based on relays, but it can also be realized by other billing units, comparing to the exiting technology whose billing unit is simply based on relays.

It should be understood that the said embodiment has been presented by way of example only, and not limitation. Thus, all modifications that fall within the scope of this invention are intended to be included therein.

The invention claimed is:

1. A method for division of revenue of communication among different proprietors, wherein the division of revenue among the different proprietors is performed by a gateway office, the method comprising that:

a) When a call goes through the gateway office, the gateway office gets a source of a calling user and a destination of a called user respectively from different proprietors, and extracts a source parameter and a destination parameter from the source and the destination;

b) The gateway office judges values of the source parameter and the destination parameter as said in step a), and if there is one of values of the parameters corresponding to a parameter value for stopping a function on the division of revenue, the division of revenue function is stopped, otherwise, a corresponding revenue zone index is obtained according to said source parameter and destination parameter and step c) is executed;

c) The gateway office judges a value of the revenue zone index as said in step b), if it corresponds to the parameter value for stopping the division of revenue function, the revenue division function is stopped, otherwise, said revenue area index is modulated according to said call, a corresponding revenue class index $R_j$, j=1, 2 . . . n is obtained, and step d) is executed;

d) The gateway office generates contents related to the revenue class index $R_j$ as said in step c), and sends the contents to a central memory of the gateway office after said calling is finished;

e) The central memory of the gateway office receives the contents related to said revenue class index $R_j$ as said in step d), and based on these contents, adds an increment of each counter in revenue class memory $M_j$ (j=1, 2 . . . n) related to the revenue class index $R_j$ to the corresponding counter and performs multiple safety mechanisms;

f) The central memory sends information in the revenue class memory $M_j$ obtained in step e) to a storage medium. The storage medium stores the information with a predefined formatted scheme and sends the information to a billing center for sorting the revenue.

2. The method according to claim 1, wherein in said step c), said revenue zone index is modulated by a modulation parameter or several modulation parameters, and the obtained revenue class index varies with different modulation parameters which include type of call, bear capacity, high level carrying (HLC), analog or ISDN user.

3. The method according to claim 1, wherein in said step d), said contents related to the revenue class index $R_j$ as said in step c) include static and dynamic information on the call as said in step a);

In said step e), the revenue class memory $M_j$ (j=1, 2 . . . n) is set according to user's needs during initialization in the gateway office;

In said step f), the central memory sends the information in the revenue class memory $M_j$ as said in step e) to a display terminal.

4. The method according to claim 1, wherein in said step e), the multiple safety mechanisms include:

The central memory introducing a windowing mechanism during a receiving procedure;

The accumulation of each counter having a hot backup;

Each counter backups its information to a pair of hard disks with specific intervals.

5. The method according to claim 1, wherein in said step f), the predefined formatted scheme is either a general scheme or a scheme customized according to user's needs.

6. An apparatus for division of revenue of communication among different proprietors, wherein the division of revenue among the different proprietors is performed by a gateway office, the apparatus comprising a source and destination device located in the gateway office, and further a trigger devices a modulation device, an information generation device, a central memory and a storage medium which are all located in the gateway office, wherein:

When a call goes through the gateway office, the source and destination device located in the gateway office respectively extracts a source parameter and a destination parameter according to a source of calling user and a destination of called user;

The trigger device judges values of the source parameter and the destination parameter, and if there is one of the values of the parameters corresponding to a parameter value for stopping a function on the division of revenue, the revenue division is stopped, otherwise, a corresponding revenue zone index is obtained according to said source parameter and destination parameter, and then judges a value of said revenue zone index, if it corresponds to the parameter value for stopping the revenue division function, the revenue division function is stopped, otherwise, said revenue zone index is sent to the modulation device;

The modulation device, according to said call, modulates said revenue area index from the trigger device, and obtains the corresponding revenue class index $R_j$, j=1, 2 . . . n;

The information generation device, according to said revenue class index $R_j$, j=1, 2 . . . n, generates contents related to said revenue class index $R_j$, and sends them to the central memory after said call is finished;

The central memory receives the contents related to said revenue class index $R_j$, and based on these contents, adds an increment of each counter in revenue class memory $M_j$ (j=1, 2 . . . n) related to the revenue class index $R_j$ to the corresponding counter, and performs multiple safety mechanisms, and then sends information in said revenue class memory $M_j$ to the storage medium;

The storage medium stores the information in said revenue class memory $M_j$ with a predefined formatted scheme and sends the information to a billing center for sorting the revenue.

7. The apparatus according to claim 6, wherein said revenue zone index is modulated in the modulation device by a modulation parameter or several modulation parameters, and the obtained revenue class index varies with different modulation parameters which include type of call, bear capacity, high level carrying (HLC), analog or ISDN user.

8. The apparatus according to claim 6, wherein:

Said contents related to the revenue class index $R_j$ include static and dynamic information on the said call;

Said revenue class memory $M_j$ (j=1, 2 . . . n) is set according to user's needs during initialization in the gateway office;

Said apparatus also includes a display terminal, which is used to display the information in said revenue class memory $M_j$.

9. The apparatus according to claim 6, wherein said multiple safety mechanisms include:

The central memory introducing a windowing mechanism during a receiving procedure;

The accumulation of each counter having a hot backup;

Each counter backups its information to a pair of hard disks with specific intervals.

10. The apparatus according to claim 6, wherein the predefined formatted scheme is either a general scheme or a customized scheme according to user's needs.

* * * * *